United States Patent [19]

Griffin et al.

[11] 4,272,862
[45] Jun. 16, 1981

[54] SKINNING APPARATUS

[75] Inventors: Dennis B. Griffin, Edgewood; Obie L. Fardo, Butler, both of Ky.

[73] Assignee: Jay Gee Manufacturing Company, Butler, Ky.

[21] Appl. No.: 80,245

[22] Filed: Oct. 1, 1979

[51] Int. Cl.³ ............................................. A22C 17/12
[52] U.S. Cl. ........................................................ 17/21
[58] Field of Search ..................................... 17/21, 50

[56] References Cited

U.S. PATENT DOCUMENTS

| 3,360,026 | 12/1967 | Schill | 17/21 W X |
| 4,025,986 | 5/1977 | Koken | 17/21 |
| 4,084,292 | 4/1978 | Harlan et al. | 17/21 X |

FOREIGN PATENT DOCUMENTS

| 84135 | 8/1971 | U.S.S.R. | 17/21 |
| 84437 | 9/1971 | U.S.S.R. | 17/21 |

Primary Examiner—Willie G. Abercrombie
Attorney, Agent, or Firm—Wood, Herron & Evans

[57] ABSTRACT

A substantially vertical drum skinning apparatus includes an improved knife, a cushioned drive and an overriding brake, all for improving a skinning operation. The knife is pivoted near the drum and is spring biased toward the drum to an adjustable stop, so that the knife is relatively rigid in line with the primary skinning force applied thereto. It is free to move slightly through a defined area and against a yieldable bias force for facilitating the clean removal of the skin. The drum is driven through a skin clamp, and a flexible cushioned drive coupling for transmitting force to the drum drive shaft and facilitating clamp engagement, and smooth removal of the skin is included. An improved overriding brake holds the drum positively until the skin is tightly clamped and is easily removable for changing worn brake plates.

18 Claims, 8 Drawing Figures

Fig. 1

SKINNING APPARATUS

This invention relates to animal skinning, and more particularly, to the machine skinning of hogs.

When slaughtering hogs, it is desirable to remove the skins from the carcasses with as little flesh left on the skin as possible, and with as few tears in the skin as possible. All of this, of course, must be done cleanly and quickly, as will keep the skinning operation compatible with the speed of the slaughtering process.

There have been numerous efforts to provide automatic or mechanical skinners. Several of these efforts have involved the use of drums to which a skin flap is attached, and which are then rotated to pull the skin from the carcass. In some cases, knives or peel bars are mounted near the drum to facilitate flesh removal from the skin. In these devices, the carcass simply turns as the hide is pulled from it, the knife or peel bar scraping the flesh side of the hide.

Examples of these skinners are particularly described in U.S. Pat. No. 4,025,986, and 4,084,292. In the device described in U.S. Pat. No. 4,025,986 for example, the drum is provided with a skin clamp, and the drum is driven by a fluid drive coupling through engagement of the clamp. Also, a peel bar is rigidly mounted near the drum. It is now desired, however, to provide a drum skinning apparatus, which is driven through a skin clamp, but without any form of fluid coupling and with a more direct and positively coupled drive from motor to drive shaft, yet while still providing a cushioned application of power to facilitate smoother clamp engagement and drum start-up.

It is further desired to provide an adjustable knife which presents a relatively rigid knife edge, but which at the same time, is yieldable to accommodate variations in skin thickness without tearing the skin, and to remove a maximum amount of flesh from the skin. An adjustably biased knife is disclosed in U.S. Pat. No. 4,084,292. However, that knife is yieldable in a direction directly opposite to this primary force applied to it by the skin. Such a knife is in many cases more yieldable than is believed to be necessary, permitting more flesh than desired to remain on the skin. It is now desired to provide a yieldably biased knife which is rigidly mounted with respect to the direction of the primary force applied to the knife edge so as to remove more flesh from the skin, but yet remains response to variations in skin thickness without tearing the skin.

Finally, while U.S. Pat. No. 4,025,986 discloses a powered hydraulic device for retarding the drum, it is now desired to provide a long wearing, overriding brake for a skinning drum which ensures positive skin clamping before the drum is driven, and which is easily maintained and adjusted.

It is also desirable to provide an improved mount or support for the rotary drum of a drum skinner.

To these ends, a preferred embodiment of the invention comprises a drum skinner having a drive shaft directly attached to the output shaft of a gear motor through a flexible coupling having a flexible annulus connected between the output shaft and the drive shaft. Upon starting of the motor, the flexible annulus gives or twists, permitting the motor the build torque, cushioning initial clamp engagement, and slightly delaying and cushioning drum rotation. Since the drum is driven through the drive shaft and the skin clamp, this flexible drum cushions the initial action of the clamp and the initial start movement of the drum, as well as effectively cushioning the power application to the drum.

An improved knife comprises a stainless steel plate or blade having a sharpened knife edge and mounted on a knife bracket which is pivoted on an axis to a frame bracket. The primary force applied to the knife by the rotating skin is approximately in line with the pivot axis, providing a rigid knife mount. Yet, the knife bracket is yieldably biased on an opposite side of the pivot toward the drum, and is movable to accommodate skin thickness variations without tearing the skin, the skin immediately against the bevel on the knife just following the knife edge pushing outwardly against the bias. This is accomplished by the very slight offset of the pivot axis toward the drum from the major lines of force.

An overriding brake is mounted at the bottom of the drum and acts between an end plate of the drum and a stationary frame member to frictionally brake the drum. A pressure plate compresses a brake plate and wears plates thereon, between itself and the end plate, but the brake and wear plates are secured, against rotation, to the stationary frame member, thus providing braking. Once initial drive torque overcomes braking pressure, the brake is overridden, the end plate and adjustable pressure plate turning against the friction provided by the brake and wear plates. The brake plate is releasably coupled to the frame member and the two-part positive engagement coupling is easily removably for replacement of the wearable brake plates, although when the brake is properly adjusted, such replacement occurs only infrequently.

In connection with the brake structure an improved drum support is provided by means of a drum support sleeve and thrust bearing rotatably surrounding a drive shaft and rotationally supporting the drum internally of the brake couplings.

Accordingly, the invention provides an improved drum skinner having an improved cushion drive, an improved knife, a positive overriding friction brake, and an improved mount or drum support. These and other objects and advantages will become readily apparent from the following detailed description of a preferred embodiment of the invention, and from the drawings, in which:

GENERAL STRUCTURE

Figure 1:
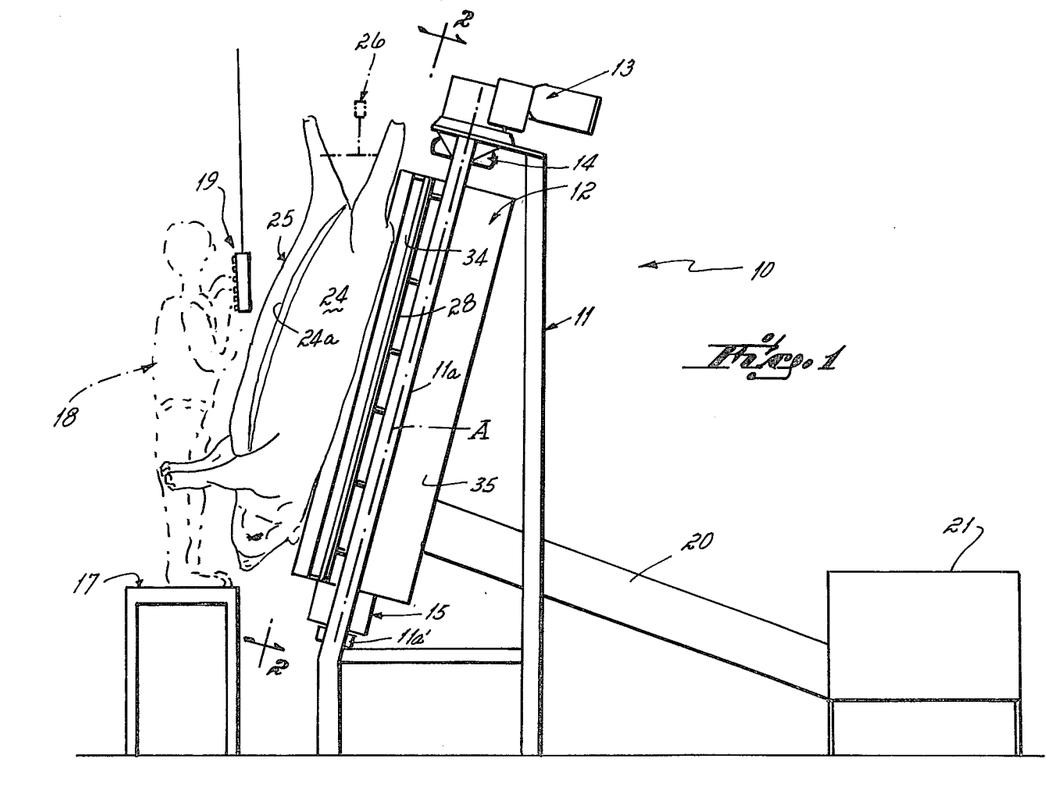
FIG. 1 is an elevational view of the invention depicting a hog skinning operation.
Figure 2:
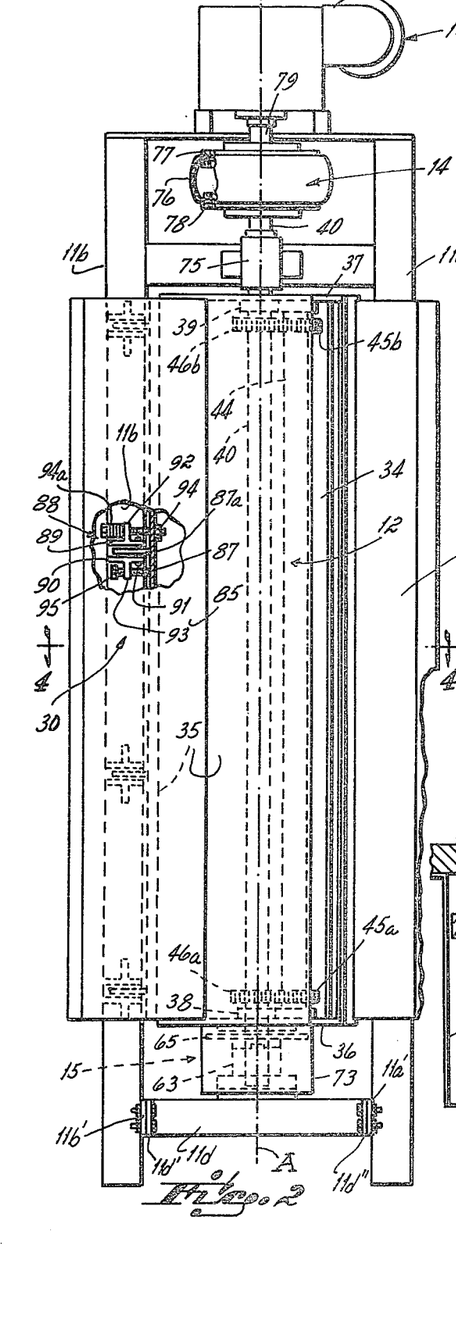
FIG. 2 is a front view of the invention taken along lines 2—2 of FIG. 1.

Turning now, to the drawings, and particularly to FIG. 1 thereof, a generally vertical skinning apparatus is shown at 10. The apparatus basically includes a frame 11, including various frame members 11a, etc., as will be described, supporting a rotatable skinning drum 12 for rotation therein, a gear motor 13, and as seen in FIG. 2, a flexible drive coupling 14 and a brake means 15.

In a slaughtering operation, the skinning apparatus 10 is further utilized, together with an operator platform 17, for the operator 18, a two-hands required control panel 19, and a skin trough and bin 20 and 21, respectively, for receiving skins which have been removed. Otherwise, a conveyor, cart or other apparatus can be used for receiving and transporting the skins. The apparatus 10 is shown in a slaughtering operation with respect to a hog carcass 25, hung by its hind legs on a hog conveyor 26 disposed to convey hogs to the general vicinity of the skinning apparatus 10.

As further shown in FIG. 1, the skinning apparatus 10 mounts the skinning drum 12 on an axis A which is inclined from the vertical at approximately 10°. As shown in FIGS. 2 and 4 through 8, a carcass support plate 28 is mounted proximate frame member 11a for supporting the carcass and maintaining it forward of frame 11. Adjustable knife means 30 (FIG. 4), is pivotally mounted on frame member 11b on the opposite side of the apparatus from the hog support plate 28.

DRUM AND CLAMP

Turning now to the more detailed features of the invention, an elongated slot 34 is disposed in the peripheral surface 35 of the rotatable skin drum 12. The elongated slot 34 is substantially parallel to the inclined axis A described above. Also provided on the drum 12, is a lower end plate 36 and an upper end plate 37, which seal off the ends of the drum. On each end plate is mounted a bearing or hub 38 and 39, respectively, for rotatably receiving a drive shaft 40. Drive shaft 40 extends from above the drum to below the drum and has, as its axis, the axis A mentioned above. Sleeves 41 can be provided in a respective hubs 38 and 39 for rotatably receiving the drive shaft 40. Thus, the drive shaft 40 is rotatable with respect to the drum 12.

Also rotatably mounted within the drum 12, and offset from drive shaft 40, is clamp shaft 44. Clamp shaft 44 is mounted in suitable end journals which are, in turn, mounted on the upper and lower end plates 37 and 38. The axis of the clamp shaft 44 is substantially parallel to the axis A of the drive shaft 40.

Figure 4:
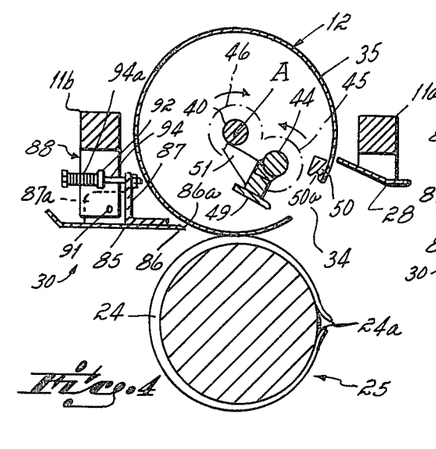
FIG. 4 is a cross-sectional view taken along lines 4—4 of FIG. 2.

Mounted on each end of the clamp shaft 44 are clamp gears 45a and 45b respectively, and as many other gears as may be found suitable for this particular size drum. These gears inter-mesh with respective gears 46a and 46b on the drive shaft 40, and remain in constant engagement therewith. Mounted to the respective gears 45 along the length of the clamp shaft 44 or otherwise secured directly to the clamp shaft 44 in order to rotate therewith, is an elongated rotatable wedge-shaped gripper element 49, mounted for operative engagement with an anvil 50, which is secured at the edge of slot 34 and is best seen in FIGS. 2 and 4. Anvil 50 includes a wedge-shaped slot 50a for receiving the wedge-shaped gripper element 49. Further mounted to the gripper element 49, or alternatively to the gears 45, or to the clamp shaft 44, are one or more stop members 51. Stop members 51 are disposed along the clamp shaft 44 so as to be in a position for selectively engaging the drive shaft 40 as will be described.

OVERRIDING BRAKE

Figure 3:
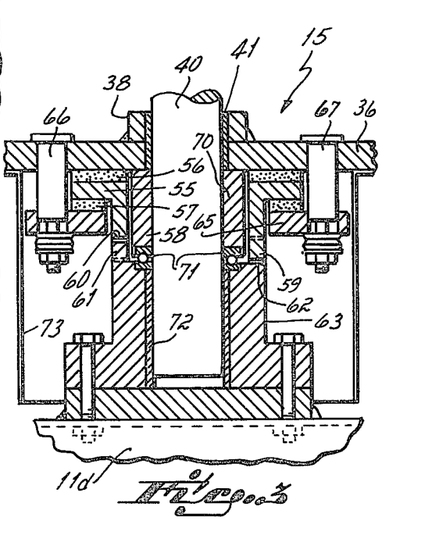
FIG. 3 is an expanded cross-sectional view of the drum brake.

Turning now to FIG. 3, the details of the brake means 15 will now be specifically described. The brake means 15 includes a brake plate 55 having mounted thereon, an upper wear plate 56, and a lower wear plate 57. The brake plate 55 is disc-like in nature, but has a central protruding coupling boss 58, which is directed downwardly as shown in FIG. 3. The lower end of the boss 58 is provided with a plurality of lugs 59 and slots 60 which cooperate with respective lugs 61 and slots 62 on a lower brake coupling 63. By means of the respective inter-engaging lugs and slots, the boss 58 and the lower brake coupling 63 cannot rotate with respect to each other, and the boss and coupling form, together, a two-part brake coupling. The lower brake coupling is bolted to frame member 11d, and thus, the coupling 63 is held against the rotation by means of the frame 11.

A pressure plate 65 is secured to, and is yieldably biased toward the end plate 36 by means of the spring guides 66 and 67, and belleville washers or other spring means thereon, for example. Thus, when the spring means are compressed, the pressure plate sandwiches the brake plate and wear plates 55, 56 and 57 between the pressure plate and the end plate 36. Since the end plate 36 and the pressure plate 65 are thus connected together, they can turn with respect to the brake plate 55 and the respective wear plates, while the brake plate and wear plates remain stationary but exert frictional drag on both the pressure plate and the end plate 36. Thus, the brake means 15 is operative to retain the drum 12 against rotation until the friction exerted by the brake means 15, via the pressure plate, the brake and wear plates and the end plate is overcome.

Considering further the brake means, it is important to note that the wear plates 56 and 57 are relatively easily replaceable when the necessity to replace them occurs. This is accomplished by means of the removable mounting of the frame member 11d, as shown in FIG. 2. Square frame member 11d is provided at each end with an elongated plate, 11d' and 11d'', respectively. Additionally, the frame members 11a and 11b are provided with corresponding elongated plates 11a' and 11b', respectively. These various plates have corresponding holes so that they can be respectively bolted together to mount the elongated frame member 11d between frame members 11a and 11b.

As previously discussed, the lower coupling 63 is mounted to the frame member 11d. Thus it will be appreciated that in order to change the wear plates 56 and 57, should that become necessary, it is only necessary to block up the drum 12, and thereafter to remove or to drop the frame member 11d. This, at the same time, disengages the coupling member 63 from the boss 58 of the brake plate 55. At that point then, pressure plate 65 can be removed, and the brake plate 55, together with the wear plates 56 and 57, can simply be removed and replaced. The brake is adjusted by adjusting the biasing pressure on the pressure plate as will be appreciated. Moreover, to check adjustment, the current drain of the running gear motor can be monitored to indicate appropriate brake friction.

DRUM SUPPORT

Further to FIG. 3, it will be appreciated that the cylindrical drum 12 is supported by a sleeve member 70 which rides on a thrust bearing 71, in turn supported by the lower brake coupling 63. Moreover, it will be appreciated that the drive shaft 40 extends through the end plate 36, the sleeve 70, the brake plate 55, the boss 58, and the lower brake coupling 63. To this end, a sleeve bearing 72 may be utilized in the lower coupling 63 to facilitate rotation of the drive shaft 40 with respect thereto.

Accordingly, it will be appreciated that the sleeve 70 may rotate with the drum 12 and end plate 36 on the thrust bearing 71, yet the brake plate 55 and the lower coupling member 63 remains stationary with respect to the rotating drive shaft and to the rotating drum 12. In order to protect the brake means 15, a skirt member 73 may be disposed around the brake means at the bottom of drum 12.

The upper end of the apparatus, as shown in FIG. 2, the drive shaft 40 is secured to a frame member 11e by means of an appropriate bearing 75.

FLEXIBLE DRIVE

The upper end of the drive shaft 40 is coupled to the gear motor 13, via the flexible drive coupling 14. Flexible drive coupling 14 constitutes a positive coupling which constantly and positively couples the gear motor 13 directly to the drive shaft 40. At the same time, the coupling provides a cushioning effect between the gear motor 13 and the drive shaft 40 as will be further described.

The flexible coupling 14 includes a flexible annulus 76 having each of its respective ends connected to couplers 77 and 78 (FIG. 2). Coupler 77 is connected to an output shaft 79 of the gear motor 13, while the coupler 78 is connected to an upper end of drive shaft 40 in any appropriate manner.

One suitable form of flexible coupling is the flexible coupling known as the "Para-Flex" coupling, Model No. PX 24, manufactured by the Dodge Division of Reliance Electric in Mishawaka, Indiana, although any suitable drive coupling of this, or other types or models may be utilized. In operation, the flexible annulus or tire 76 (FIG. 2), is rotated by the output shaft 79 and coupler 77. However, since the flexible annulus is flexible and is not entirely rigid, it tends to flex or twist, thus cushioning the torque imparted to the drive shaft 40. The utilization of such a coupling thus has the beneficial features of cushioning the drive, while at the same time, eliminating the requirement for torque converters or fluid drive systems which are not entirely positive by way of constant engagement.

ADJUSTABLE KNIFE

Turning now to a description of the knife means 30, FIG. 2, and FIGS. 4-8 depict the details of the knife and the knife mounting. Basically, the knife includes a stainless steel blade member 85, having a sharpened knife edge 86. The blade 85 is mounted on a knife bracket 87, and the blade 85 is extended quite a distance rearwardly of the knife edge 86, so as to provide a protective plate forward of the frame member 11b. This blade member then also constitutes a carcass supporting plate for the hog carcass as the carcass is skinned. Knife bracket 87 includes a knife bracket flange 87a, which is pivoted on a pivot axis 91 to a frame bracket 88, comprising flanges 89 and 90. The pivot axis 91 of the knife bracket 87 to the frame bracket 88 is best depicted in FIGS. 4-8 at 91. As shown, this axis is very close to the blade 85, and is located just on the drum side of the blade.

Extending upwardly and downwardly, respectively, from the flanges 89 and 90 are bosses 92 and 93. Boss 92 mounts therethrough a spring guide 94 which is attached directly to the knife bracket 87 at one end of the spring guide. Spring means 94a is located between the other end of the spring guide and the boss 92, so as to constantly bias the knife bracket 87 and the knife 85 thereon in a counter-clockwise direction (FIG. 4). It will be appreciated that the biasing means provided by the spring guide and the spring means is located on the opposite side of the pivot axis 91 from the knife blade.

The lower boss 93 is threaded to mount a stop screw 95 therein. Stop screw 95 has an end engagable with the knife bracket 87, thus, the adjustable stop screw 95 can be adjusted to limit the proximity of the knife edge 86 to the peripheral surface 35 of the skinning drum 12, while at the same time, the yieldable biasing means provided by the spring guide and spring means serves to yieldably bias the knife edge 86 toward the drum. The adjustable stop means provided by the stop screw 95 thus limits the minimum distance between the knife edge 86 and the drum, but the knife edge is always biased toward that minimum distance position by the yieldable biasing means. Further, it will be appreciated that the surface 35 of the drum 12, near the knife edge 86, the knife edge 86, and the pivot axis 91 are approximately in line with each other, the axis 91 being offset slightly toward the drum. Thus, any primary force provided in this direction by any skin, which is on the drum, is transmitted in line along the knife edge and just to the side of the pivot axis 91. This provides for a very rigid knife mount as opposed to a situation where the axis is much further offset, and the knife edge 86 is not significantly yieldable or movable away from the surface 35 by means of the primary force exerted on the knife edge 86 by a skin between that edge and the drum surface 35, other than in response to tough, thicker skin sections. Also, it should be appreciated that a beveled surface 86a extends rearwardly from knife edge 86. Since the pivot axis 91 is not directly in line with the knife edge and drum surface, slight movement of the knife away from the drum surface 35 is possible, responsive to skin thickness variations. The spring means, however, can be tightly compressed so that only skin thickness variations, and not flesh, will move the knife outwardly. Thus, the combination of the slightly offline pivot and the adjustable spring bias, provides highly efficient flesh removal with little, if any, skin tearing.

Of course, it will be appreciated that a plurality of knife brackets and frame brackets can be disposed along the knife blade 85 and correspondingly, along the frame member 11b for supporting the knife along its length. Furthermore, it will be appreciated that the knife blade 85 and the knife edge 86 extends substantially along the entire length of the drum.

Finally, it will be appreciated that the invention provides, in operation, a direct cutting of the skin from the carcass since the knife edge is positioned at the point of skin removal. Tearing of the skin from the carcass is significantly reduced or eliminated.

OPERATION

Figure 5:
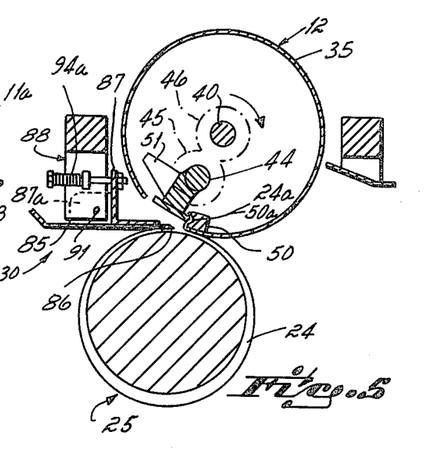
FIGS. 5-8 are views similar to FIG. 4 showing the drum, clamp and knife in their various operative positions.

Turning now to a description of the operation of the preferred embodiment of the invention, and referring specifically to FIGS. 4-8, it will be appreciated that FIG. 4 depicts a hog carcass 25 in illustrative form only, the hog carcass having thereon a hide or skin 24 which is to be removed therefrom. The skin has been pre-cut so as to provide a skin flap 24a. In a first step, the hog carcass 25 is moved by means of the conveyor 26 to a position adjacent the skinning apparatus 10. During this operation it may be necessary to slightly move the lower end of the hog away from the machine and then across the hog support plate 28, and into position proximate the drum 12. At this point, the hog carcass 25 is turned until the skin flap 24a can be placed into the slot 34 proximate the anvil 50. Once the skin flap lies across the anvil 50, the operator removes his hands from the slot, places both hands on the safety control panel 19, and actuates the skinning cycle. In a safety aspect hereof, the control is constructed so that the operator must leave his hands on the panel until the clamp closes and passes beneath the knife. At this point, the drive shaft 40 is rotated by the gear motor 13 in a clockwise direction as seen in FIGS. 4 and 5, and the inter-meshing of the gears 45 and 46 cause the clamp shaft 44 and the gear 45 to rotate in a counter-clockwise direction. This moves the gripper element 49 toward and into engagement with the skin flap 24a against the anvil 50. During this motion of the drive shaft, it will further be appreciated that the drum 12 remains in a stationary position, held there by the brake means 15. The drum stays in this stationary position until the gripper element 49 securely clamps the skin flap 24a into the anvil 50.

It will further be appreciated that the brake means 15 is adjusted so that the clamping force is considerable before the friction of the brake means is overcome. Once the gripper element has firmly engaged the skin flap 24a with such force as to overcome the overriding brake means 15, the drum 12 is thus rotated through the clamping means by means of the engagement of the drive shaft through the gears, the clamp shaft 44, the gripper element and anvil, to the drum 12. When this is accomplished, the drum revolves in a clockwise direction as viewed in FIG. 5, for example.

Continued motion of the drum draws the skin from the carcass around the drum with the flesh side of the skin away from the drum surface 35. The knife edge 86 is disposed so as to scrape or cut flesh from the flesh side of the hide or the skin.

It will be appreciated that the engagement of the knife edge with the carcass and with the flesh side of the skin generates, together with the force of the pulling the skin from the carcass, a substantial torque. It is thus necessary, to firmly grip the skin flap between the gripper element and the anvil 50 before the substantial engagement of the knife edge 86 with the carcass and the flesh side of the skin, and this is accomplished by the action of the properly adjusted brake means 15.

Figure 6:
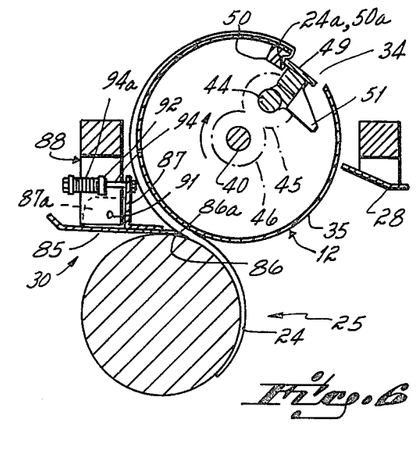

Continual clockwise rotation of the drum pulls the skin from the carcass and tends to rotate the carcass, as shown in FIG. 6, with the knife removing a substantial amount of any flesh which may be left with the hide. Because the point at which the knife edge engages the underside of the hide is approximately in line with the pivot axis 91, as shown in FIG. 6, the knife does not move or yield significantly, and a substantial amount of the flesh is removed from the hide. As the thicker portions of the hide pass the knife edge 86 and under the beveled portion 86a, however, they are operable to rotate the knife edge 86 slightly more away from the underside of the hide and the surface 35 of the drum, against yieldable biasing means provided by the spring guide 94 and its associated spring means. Thus, the knife can be moved outwardly from the drum to accomodate variation in the thickness of the hide such as, for example, in the middle of the hide which would constitute the back of the hog being skinned and which is typically thicker than the ends of the hide which constitute the underneath or belly portion of the hog.

Figure 7:
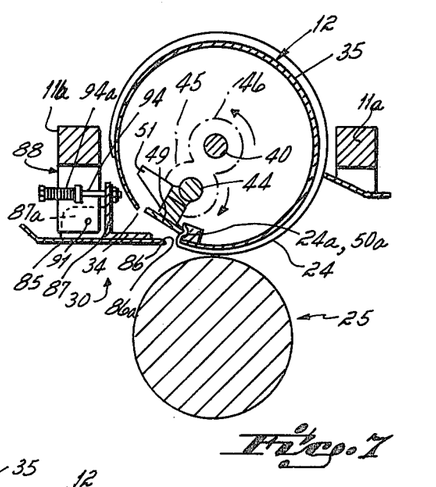
Figure 8:
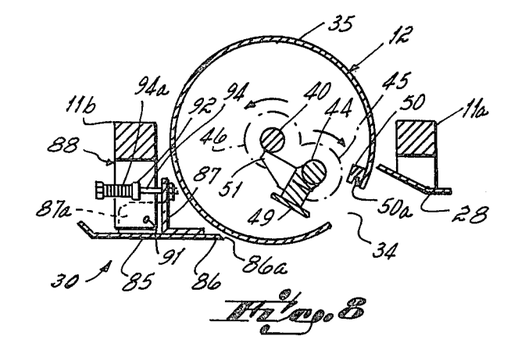

In one embodiment of the invention, the drum 12 makes more than a complete revolution with respect to the knife and to the position as shown in FIG. 7. At this point, the rotation of the gear motor is automatically reversed to reverse rotation of the drive shaft 40 to the counter-clockwise direction. This motion imparts clockwise direction to the clamp shaft 44 and thus, rotates the gripper 49 away from the anvil 50, releasing the skin flap 24a. At this point, the skin 24 is free to fall from the drum and into a skin receiving through or bin, such as the trough or bin 20 and 21, as shown in FIG. 1. Continued counter-clockwise motion of the drive shaft 40 drives the clamp shaft 44 in a clockwise direction until the stop 51 directly engages the drive shaft 40. At this point, continued rotation of the drive shaft 40 in a counter-clockwise direction drives the drum 12 also in a counter-clockwise direction, via the connection of the drive shaft to the clamp shaft 44, and the stop provided on the clamp shaft 44 by the stop element 51. Thus, the drum is returned to its start position as indicated in FIG. 8.

Of course, depending on the circumferences of the drum and its relationship to the circumferences of a hog to be skinned, it may not be necessary to utilize this back-up mode of operation, since as shown in FIGS. 4-7, where the drum has a larger circumference than the hog, the skin can be completely removed from the hog before the slot 34 moves to a position proximate the knife edge 86 and travels through more than 360°. In this situation, it is only necessary to stop the drum and to reverse rotation of the drive shaft so as to open the clamp. Whereupon, once the clamp is open, the drum is in condition for receiving a new skin flap.

Of course, it will be appreciated that any suitable motor controls can be utilized including such timers and reversing switches or relays as may be necesary to operate the drive motor. These can be operated by an appropriate cam rotating with the drum.

It will thus be appreciated, that the preferred embodiment of the invetion provides several unique advantages. A direct drive between the gear motor and the drive shaft of the drum is accomplished while retaining a cushioning effect. Such cushioning effect is highly beneficial, particularly in the initial drive stages of the drum where the gripper element 49 is driven toward the anvil and the skin flap. The cushioning effect provided by the flexible coupling as described herein, permits a smoother engagement of the gripper element 45 with the skin flap in the anvil, and permits a slight cushioning or delay before the skin is pulled from the hog carcass. This helps to insure firm gripping of the skin flap and a smoother start-up of the pulling operation, and the fewer skins are torn than if no cushioning was provided at all.

It will further be appreciated that the particular brake means can be adjusted through a wide range of pressures to provide the desired frictional braking forces sufficient to permit firm skin clamping prior to the operation of the drum. Moreover, it will be appreciated that the wear plates of the brake means can be easily replaced simply by locking up the drum and withdraing the lower coupling and the pressure plate. Disassembly of the entire unit is thus not required. At the same time, an improved support for the rotating drum is provided, and which can also be readily serviced or components replaced, if necesary.

Finally, it will be appreciated that the improved knife described herein, provides for more efficient flesh removal from the hides or skins, while at the same time, reduces tearing of the hides or the skins, all by virtue of the fact that the knife edge is rather rigidly mounted with respect to the main force exerted thereon, and yet, the knife is yieldably biased for accommodating skin thickness variations.

These and other advantages and modifications will become readily apparent to one of ordinary skill in the art without departing from the scope of this invention, and the applicants' intend to be bound only by the claims appended hereto.

We claim:

1. Apparatus for skinning hogs, including a rotatable drum, a skin clamp means operatively associated with said drum, and a skinning blade, said drum mounted on a rotatable drive shaft operatively connected with said skin clamp means for driving said drum through said skin clamp means, the improvement wherein said apparatus further includes;

an end plate fixed at one end of said drum, an adjustable brake means mounted on said end plate of said drum, said adjustable brake means including, brake plate means, a spring-loaded pressure plate means for biasing said brake plate means against and into frictional engagement with said end plate, said brake plate means disposed between said end plate and said pressure plate means, and means for holding said brake plate stationary against rotation when said drum is rotated, for braking said drum.

2. Apparatus, as in claim 1, wherein said brake plate means comprises a central brake plate and two wear plates, one mounted on each side of said central brake plate.

3. Apparatus, as in claim 2, wherein a first wear plate frictionally engages said end plate, and wherein a second wear plate frictionally engages said pressure plate means.

4. Apparatus as in claim 3, wherein said central brake plate is coupled to said means for holding said brake plate stationary.

5. Apparatus as in claim 4, wherein said stationary holding means includes a two-part separable coupling means, a first part extending from said brake plate, and through said presure plate, and a second part attached to said frame member of said apparatus, said two-parts normally engaging non-rotationally with respect to each other.

6. Apparatus as in claim 5, wherein each part of said two-part separable coupling means has respectively cooperating releasable lugs and slots for securing said two parts together against rotation with respect to each other, and wherein said frame member of said apparatus is movable in a direction away from siad end plate, and said two parts are selectively movable away from each other for disengagement to permit replacement of said wear plates.

7. Apparatus as in claim 1, wherein said means for holding said brake plate means stationary against rotation includes a frame member and a selectively separable coupling means removably securing said brake plate means to said frame member.

8. Apparatus as in claim 7, wherein said frame member is movable to permit separation of said coupling means.

9. Apparatus for skinning hogs, including a frame, a rotatable drum, a rotatable drive shaft extending axially through said drum and mounted to said frame, a skin clamp means operatively associated with said drum, and a skinning blade, said rotatable drive shaft operatively connected with said skin clamp means for driving said drum through said skin clamp means, the improvement wherein said apparatus further includes:

an end plate fixed at a lower end of said drum, said drive shaft extending through said end plate, a sleeve around said drive shaft, said sleeve engaging said end plate at an upper end and having a lower end, bearing means supporting said lower end of said sleeve, coupling means mounted on said frame and supporting said bearing means, said sleeve and said drum, said drive shaft extending through said sleeve, bearing means and coupling means, and being rotatable with respect to said drum, sleeve, bearing means and coupling means.

10. Apparatus as in claim 9, further including a brake means operatively engaging said end plate, said brake means including, a disc-shaped brake plate, a biased pressure plate mounted on said end plate and compressing said brake plate between said end plate and said pressure plate, a boss extending from said brake plate through said pressure plate and operatively engaging an upper end of said coupling means for holding said brake plate against rotation.

11. Apparatus for skinning hogs, including a frame, a rotatable drum, a rotatable drive shaft extending axially through said drum, a skin clamp means operatively associated with said drum, and a skinning blade, said rotatable drive shaft operatively connected with said skin clamp means for driving said drum through said skin clamp means, the improvement wherein said skin clamp apparatus further includes, an axially extending slot in a surface of said drum, an anvil mounted within said drum proximate said slot, a clamp shaft mounted within said drum parallel but offset from said drive shaft, first gears on said drive shaft, second gears on said clamp shaft, said first and second gears cooperatively intermeshing, a gripper element mounted within said drum on said clamp shaft for movement toward and away from said anvil to grip a skin flap therebetween, said drive shaft being operatively coupled to said gripper element for rotating said gripper element in one direction against said anvil and for rotating said drum in an opposite direction through said skin flap clamp means, wherein said drum is stationary throughout initial movement of said drive shaft and said clamp shaft, and wherein said drum turns in said opposite direction in response to said gripper element rotating in said one direction into operative gripping engagement with a skin flap between it and said anvil, and said apparatus further including a stop element mounted with said gripper element for movement therewith, said stop element disposed to engage said drive shaft when said drive shaft rotates in said one direction to rotate said gripper shaft in a said opposite direction for rotating said drum in said one direction.

12. Apparatus as in claim 11, further comprising brake means for frictionally biasing said drum against rotation by said drive shaft.

13. Apparatus as in claim 12, wherein said brake means comprises, an end plate in said drum, a brake plate in frictional engagement with said end plate, a pressure plate biasing said brake plate against said end plate, and biasing means securing said brake plate against rotation with respect to said drum.

14. Apparatus for skinning hogs including a frame, a drum means mounted for rotation about a longitudinal drum axis, and having a cylindrical skinning engaging surface, a skin flap clamp in said drum means for holding a skin flap of a hog, a skinning knife means mounted proximate said skin engaging surface of drum means and having a longitudinal knife edge parallel to said axis and disposed at a position spaced from said surface a distance approximately equal to a thickness of a hog skin, and means yieldably biasing said knife edge toward said skin engaging surface, the improvement wherein, said knife is pivoted to said frame on a pivot axis approximately in line with said knife edge and the direction in which skin is pulled toward said knife edge, said pivot axis disposed on the same side of said knife means as said drum means.

15. Apparatus as in claim 14, including a frame bracket on said frame, a knife bracket on said knife means, means pivoting said knife bracket to said frame bracket on a pivot axis parallel to said longitudinal drum axis, said knife means disposed on one side of said pivot axis and said yieldable biasing means disposed on another side of said pivot axis.

16. Apparatus as in claim 15, wherein said yieldable biasing means includes a boss fixed to said frame bracket on one side of said axis, a spring guide slidably disposed in said boss, spring means biasing said guide away from said skin engaging surface, and means connecting an end of said spring guide to said knife bracket on the same side of said axis as said boss for biasing said knife edge toward said skin engaging surface.

17. Apparatus as in claim 16, further including an adjustable stop means for limiting movement of said knife edge toward said drum, and including a second boss attached to said frame bracket on said one side of said pivot axis, and a stop bolt adjustably threaded in said second boss, one end of said stop bolt engaging said knife bracket on said same one side of said axis.

18. Apparatus as in claim 17, further including a plurality of cooperating frame and knife brackets disposed along and proximate the surface of said drum means.

* * * * *

UNITED STATES PATENT AND TRADEMARK OFFICE
CERTIFICATE OF CORRECTION

PATENT NO. : 4,272,862

DATED : June 16, 1981

INVENTOR(S) : Dennis B. Girffin and Obie L. Fardo

It is certified that error appears in the above-identified patent and that said Letters Patent are hereby corrected as shown below:

Col. 1, line 48, "response" should be --responsive--.

Col. 1, line 64, after the word "motor", "the" should be --to--.

Col. 1, line 68, "drum" should be --drive--.

Col. 8, line 1, "through" should be --trough--.

Col. 8, line 32, "invetion" should be --invention--.

Col. 8, line 52, "withdraing" should be --withdrawing--.

Col. 9, line 38, "presure" should be --pressure--.

UNITED STATES PATENT AND TRADEMARK OFFICE
CERTIFICATE OF CORRECTION

PATENT NO. : 4,272,862

DATED : June 16, 1981

INVENTOR(S) : Dennie B. Girffin and Obie L. Fardo

It is certified that error appears in the above-identified patent and that said Letters Patent is hereby corrected as shown below:

Col. 9, line 47, "siad" should be -- said --.

Signed and Sealed this

Seventeenth Day of August 1982

[SEAL]

Attest:

GERALD J. MOSSINGHOFF

Attesting Officer

Commissioner of Patents and Trademarks